(12) United States Patent
Beuschel et al.

(10) Patent No.: US 11,859,727 B2
(45) Date of Patent: Jan. 2, 2024

(54) ACTUATOR UNIT FOR A VALVE, VALVE, VALVE ASSEMBLY AND ADJUSTING DEVICE

(71) Applicant: Conti Temic microelectronic GmbH, Nuremberg (DE)

(72) Inventors: Michael Beuschel, Stammham (DE); Johann Steinberger, Brunnen (DE); Johann Riepl, Denkendorf (DE); Stefan Bauer, Engelbrechtsmünster (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 17/615,808

(22) PCT Filed: Jun. 2, 2020

(86) PCT No.: PCT/EP2020/065189
§ 371 (c)(1),
(2) Date: Dec. 1, 2021

(87) PCT Pub. No.: WO2020/245103
PCT Pub. Date: Dec. 10, 2020

(65) Prior Publication Data
US 2022/0325815 A1    Oct. 13, 2022

(30) Foreign Application Priority Data
Jun. 3, 2019    (DE) .................... 10 2019 208 051.0

(51) Int. Cl.
*F16K 11/22*    (2006.01)
*F16K 31/02*    (2006.01)
(Continued)

(52) U.S. Cl.
CPC ............ *F16K 31/025* (2013.01); *B60N 2/665* (2015.04); *B60N 2/914* (2018.02); *F16K 11/22* (2013.01)

(58) Field of Classification Search
CPC .......... B60N 2/914; B60N 2/665; F16K 31/02
See application file for complete search history.

(56) References Cited

U.S. PATENT DOCUMENTS 10,947,097 B2 *  3/2021  Clifton ...................... B67B 7/28
2007/0114480 A1  5/2007  Burke
(Continued)

FOREIGN PATENT DOCUMENTS

CN          1585868 A       2/2005
CN        101328987 A      12/2008
(Continued)

OTHER PUBLICATIONS

Langbein et al. "Konstruktionspraxis Fromgedächtnistechnik", Chapter 5, p. 62, Chapter 11, p. 161, Chapter 14, p. 217, Springer Vieweg, 2013, ISBN: 978-3-658-17903-8; Electronic ISBN: 978-3-658-17904-5. Concise Explanation of Relevance: The book shows just (publicly known) examples how SMA wire contraction can be converted to actuator or valve stroke.
(Continued)

*Primary Examiner* — Syed A Islam

(57) ABSTRACT

Disclosed is an actuator unit for opening or closing a valve opening of a valve for a pneumatic adjusting device of a vehicle seat, comprising a circuit board with a top side extending in a circuit board plane, an actuating element with an actuating section for opening or closing the valve opening and a bending section connected to the actuating section, and an actuator element with a first end mechanically connected to the actuating section and a second end mechanically connected to the circuit board. The actuator element is configured to, when actuated, bend the bending section such
(Continued)

Figure 1:
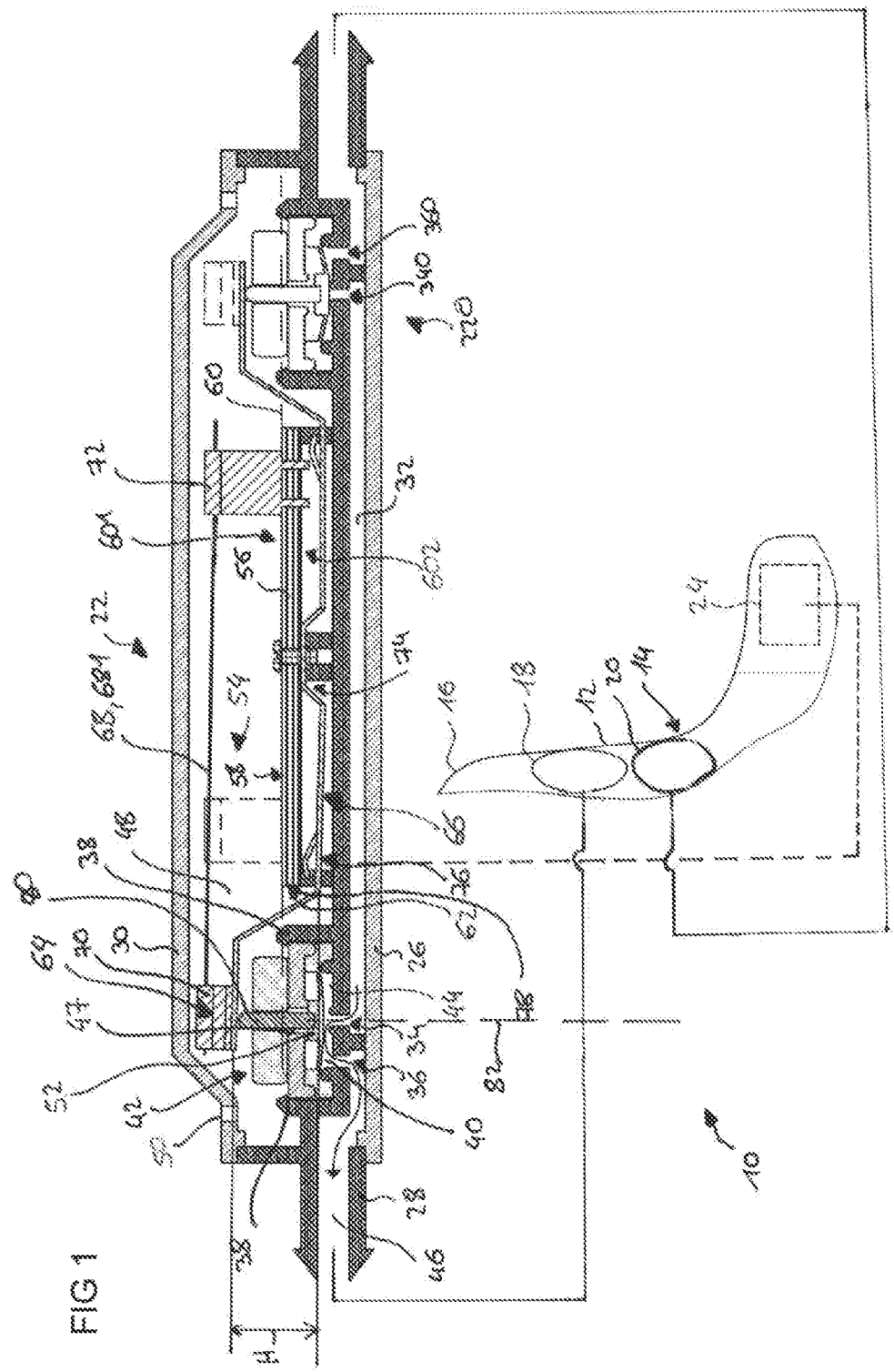

that the actuating section is moved between a first position for opening the valve opening and a second position for closing the valve opening. The actuating section is arranged on a first side and the bending section is arranged on a second side, situated opposite the first side, respective of the circuit board plane.

16 Claims, 4 Drawing Sheets

(51) Int. Cl.
  *B60N 2/66* (2006.01)
  *B60N 2/90* (2018.01)

(56) References Cited

U.S. PATENT DOCUMENTS

| | | | |
|---|---|---|---|
| 2014/0117262 A1 | 5/2014 | Deperraz et al. | |
| 2016/0018016 A1 | 1/2016 | Dankbaar et al. | |
| 2019/0049033 A1 | 2/2019 | Mitzler et al. | |
| 2019/0353266 A1 | 11/2019 | Doerfler et al. | |
| 2019/0353270 A1* | 11/2019 | Dörfler | B60N 2/99 |
| 2019/0355326 A1 | 11/2019 | Doerfler et al. | |
| 2020/0101883 A1 | 4/2020 | Beuschel et al. | |
| 2020/0103047 A1 | 4/2020 | Beuschel et al. | |
| 2020/0378516 A1 | 12/2020 | Beuschel et al. | |
| 2021/0018109 A1 | 1/2021 | Beuschel et al. | |

FOREIGN PATENT DOCUMENTS

| | | | |
|---|---|---|---|
| CN | 102788157 A | 11/2012 | |
| CN | 103827562 A | 5/2014 | |
| CN | 105121928 A | 12/2015 | |
| CN | 109296806 A | 2/2019 | |
| DE | 102016219342 A1 | 4/2018 | |
| DE | 102016219346 A1 | 4/2018 | |
| DE | 102016225519 A1 | 6/2018 | |
| DE | 102017204662 B3 | 7/2018 | |
| DE | 202017104440 U1 | 9/2018 | |
| DE | 202017104441 U1 | 9/2018 | |
| DE | 202018102797 U1 | 5/2019 | |
| DE | 202018102798 U1 | 5/2019 | |
| DE | 102018201444 A1 | 8/2019 | |
| DE | 102018112089 A1 | 11/2019 | |
| DE | 102018112090 A1 | 11/2019 | |
| DE | 102018112091 A1 | 11/2019 | |
| DE | 102018216874 A1 | 4/2020 | |
| DE | 102018216876 A1 | 4/2020 | |
| GB | 2146411 A | 4/1985 | |
| GB | 2146411 A * | 4/1985 | F16K 31/025 |

OTHER PUBLICATIONS

Office Action dated May 30, 2023 from corresponding Chinese patent application No. 202080041283.8.

* cited by examiner

FIG 3

ACTUATOR UNIT FOR A VALVE, VALVE, VALVE ASSEMBLY AND ADJUSTING DEVICE

The present invention relates to an actuator unit for a valve, in particular an actuator unit for opening and/or closing a valve opening of a valve for a pneumatic adjusting device of a vehicle seat. The present invention furthermore relates to a valve having an actuator unit of said type, to a valve assembly having a valve of said type, and to an adjusting device having a valve of said type.

In modern vehicle seats, fluid chambers or fluid bladders which can be filled with a pressure medium, in particular with a gaseous pressure medium such as compressed air, are situated as control elements in the region of the seat face or backrest (together also referred to as seat contact face). Such fluid chambers can be supplied with the pressure medium via a respective pressure medium line. The volume of said fluid chambers is increased by filling a respective fluid chamber with pressure medium, or decreased by emptying said fluid chamber, respectively, such that the properties of the seat contact face, in particular the contour of the latter, can be varied. For the filling of the respective fluid chamber with pressure medium, the pressure medium is firstly generated by a pressure medium source, for example by a compressor or a compressor unit, and guided via a suitable valve to a respective fluid chamber in controlled fashion.

In order to be able to actuate such valves, actuator units are commonly used, which open or close a valve opening of the valve. Actuator units of said type however require a certain amount of installation space, which is however often limited owing to modern vehicle technology (electrical adjustment of the vehicle seats, safety devices, etc.).

It is therefore an object of the present invention to provide as compact as possible an actuator unit for opening and/or closing a valve opening of a valve, in particular of a valve for a pneumatic adjusting device of a vehicle seat. It is furthermore an object of the present invention to provide a valve having an actuator unit of said type, a valve assembly having a valve of said type, and an adjusting device for adjusting a contour of a seat contact face of a vehicle seat having a valve of said type.

These objects are achieved by an actuator unit as claimed in patent claim 1, a valve as claimed in patent claim 11, a valve assembly as claimed in patent claim 13 and an adjusting device as claimed in patent claim 14. Advantageous design embodiments are the subject matter of the dependent claims.

According to a first aspect of the present invention, an actuator unit for opening and/or closing a valve opening of a valve for a pneumatic adjusting device of a vehicle seat is created. The actuator unit comprises a circuit board, which has a top side which extends in a circuit board plane. In the context of the present disclosure, the term "circuit board" describes a carrier for electronic components, which is used for the mechanical fastening and electrical connection of the electronic components. In the context of this disclosure, the term "circuit board plane" denotes a plane of extent of the circuit board. The actuator unit according to the invention furthermore comprises an actuating element, which has an actuating section for opening and/or closing the valve opening and a bending section connected to the actuating section. The bending section makes the actuating element flexible. For example, the bending section has a (virtual) center of rotation about which the actuating section is rotatable. The actuator unit furthermore comprises an actuator element, which has a first end which is mechanically connected to the actuating section and a second end which is mechanically connected to the circuit board. The actuator element is furthermore designed to, when the actuator element is actuated or correspondingly controlled, bend the bending section such that the actuating section is moved between a first position for opening the valve opening and a second position for closing the valve opening. According to the invention, the actuating section of the actuator unit is arranged on a first side with respect to the circuit board plane and the bending section of the actuator unit is arranged on a second side, situated opposite the first side, with respect to the circuit board plane.

Since it is the case in the actuator unit according to the invention that the actuating section, which is designed to open and/or close the valve opening, and the bending section, which ultimately makes the movement/rotation of the actuating section possible, are arranged on opposite sides with respect to the circuit board plane, it is on the one hand the case that the structural height of the actuator unit is reduced, whereby a space-saving actuator unit and a space-saving valve having an actuator unit of said type can be created. Since the bending section and the actuating section are furthermore arranged on opposite sides with respect to the circuit board plane, it is on the other hand possible for a strong lever action for the actuator element to be achieved with a relatively small structural height. As a result, despite the small structural height of the actuator unit, a relatively high actuator force/actuating force is generated for the opening and/or closing of the valve opening.

The actuator unit according to the invention is based on the concept, on the one hand, of minimizing the structural height of the actuator unit by virtue of the actuating element of the actuator unit being arranged partially below and partially above the circuit board plane. On the other hand, the actuator force for opening and/or closing the valve opening is increased by virtue of the actuating section and the bending section being arranged on opposite sides with respect to the circuit board plane. By means of this arrangement, a relatively large lever (distance between the actuating section and the bending section measured in a direction perpendicular to the circuit board plane) can be created, which leads to a relatively large lever ratio with a minimized space requirement.

In one design embodiment of the actuator unit according to the invention, the actuator element has a shape memory alloy element that is deformable by application of electrical power to the shape memory alloy element, wherein the first end of the shape memory alloy element is electrically and mechanically connected to the actuating section and the second end of the shape memory alloy element is electrically and mechanically connected to the circuit board. The structural height of the actuator unit can be further reduced by virtue of the actuator element being in the form of a shape memory alloy element.

According to a particularly preferred design embodiment, the actuator element or the shape memory alloy element is arranged exclusively or only on the first side with respect to the circuit board plane and thus on the side of the actuating section. This has the advantage that the actuator element or shape memory alloy element can be installed in a simple manner. In particular, the actuator or shape memory alloy element can be installed on the subassembly composed of the actuating element, circuit board and intermediate element from one side of said subassembly, without the subassembly having to be turned in the process.

According to a further design embodiment, the actuating element furthermore has a circuit board fastening section which is arranged on the second side with respect to the circuit board plane and thus on the side of the bending section. This design embodiment is characterized by particularly simplified assembly, because the circuit board can be installed directly on the circuit board fastening section of the actuating element. The circuit board fastening section is in this case preferably electrically and mechanically connected to the circuit board.

According to a further design embodiment, the actuating element furthermore has an end position contacting section which, upon making contact with the circuit board, indicates an end position of the actuating section, wherein the end position contacting section is arranged on the second side with respect to the circuit board plane and thus on the side of the bending section. By means of this design embodiment, it is achieved that firstly the bending element and then the circuit board can be installed on the intermediate element in each case by way of a simple rectilinear joining movement.

According to a further design embodiment, the bending section is configured to, in the absence of actuation by the actuator element, preload the actuating section in the first position for opening the valve opening or in the second position for closing the valve opening. In this design embodiment, the bending section has not only a bending function but also a restoring function, such that a normally open or normally closed actuator unit with a small structural height can be implemented. This can be achieved for example by virtue of the bending section being of rotationally flexible form in relation to the rest of the actuating element (for example by way of a relatively small thickness or a recess present in the bending section).

According to a further design embodiment, the actuator unit furthermore has a plunger element which is designed to bear sealingly against a valve seat of the valve opening, wherein the plunger element is mechanically couplable (for example in the form of a floating bearing) to the actuating section and is arranged such that a longitudinal extent direction of the plunger element extends through the circuit board plane or intersects the circuit board plane. In a particularly preferred design embodiment, the longitudinal extent direction of the plunger element is in this case substantially perpendicular (taking into consideration error tolerances during production or during assembly) to the circuit board plane. By means of this particularly preferred design embodiment, a substantially 90° diversion is realized between a for example horizontally running force flow of the actuator element, which in turn actuates the actuating section, and a for example vertically running plunger element, which ultimately opens and closes the valve opening. The 90° diversion thus combines a particularly small structural height with a particularly effective diversion of the force flow with a simultaneously sufficiently large lever ratio.

According to a further design embodiment, the actuating section projects beyond a lateral edge of the circuit board (as viewed in the longitudinal extent direction of the circuit board plane). Alternatively, the circuit board may have a cutout in the region of the actuating section. In these design embodiments, the actuating section and the circuit board are arranged adjacent to one another in the extent direction of the circuit board plane, as a result of which the actuator unit has an even more compact design and, in addition, material can be saved in the production of the circuit board.

According to a further design embodiment, the actuating section furthermore has a flow guide section which guides a flow flowing out of the valve opening away from the actuator element. Such a flow guide section may for example be designed as a flow edge in the form of a beveled side edge of the actuating section. The advantage of this design embodiment is that, in particular if a temperature-sensitive actuator element such as a shape memory alloy element is used, the flow flowing out of the valve opening has no or almost no undesired temperature influence on the actuator element.

According to a second aspect of the present invention, a valve for a pneumatic adjusting device of a vehicle seat is created. The valve comprises a valve housing, which defines a valve chamber with a valve opening, and an actuator unit according to the first aspect or design embodiments thereof. With the valve according to the invention, a particularly compact valve is created which is characterized by a small structural height and a strong lever action.

According to one design embodiment of the valve, the valve opening divides the valve chamber into a first region, which is fluidically connected to surroundings of the valve, and into a second region, which is fluidically connected to a fluid source of the valve. In the case of the valve according to the invention, the actuator unit is situated in the first region, that is to say in the region fluidically connected to the surroundings of the valve, and thus not in the pressurized second region of the valve chamber. This has the advantage that no air-tight leadthroughs of electrical lines or conductor tracks are required for the actuator element. Furthermore, the actuator unit and the circuit board are not exposed to the increased relative atmospheric humidity that arises as a result of the positive pressure. An influence of condensation effects that arise under certain circumstances on the actuator element and/or the circuit board can thus be avoided.

According to a third aspect of the present invention, a valve assembly for a pneumatic adjusting device of a vehicle seat is created. The valve assembly comprises a first valve according to the second aspect or design embodiments thereof and a second valve according to the second aspect or design embodiments thereof, wherein the actuating element of the first valve and the actuating element of the second valve are formed jointly or together in one piece in the form of a one-piece actuating element assembly. The valve assembly according to the invention is not only distinguished by a particularly small structural height owing to the valves according to the first aspect or design embodiments thereof. In addition, through the use of an actuating element assembly, material and time can be saved in the production of the valve assembly.

According to a fourth aspect, finally, an adjusting device, in particular a pneumatic adjusting device, for adjusting a contour of a seat contact face of a vehicle seat is created. The adjusting device has a fluid bladder for adjusting the contour of the seat contact face, and has a valve according to the first aspect or design embodiments thereof, wherein the valve opening of the valve is fluidically connected to the fluid bladder.

Figure 2:
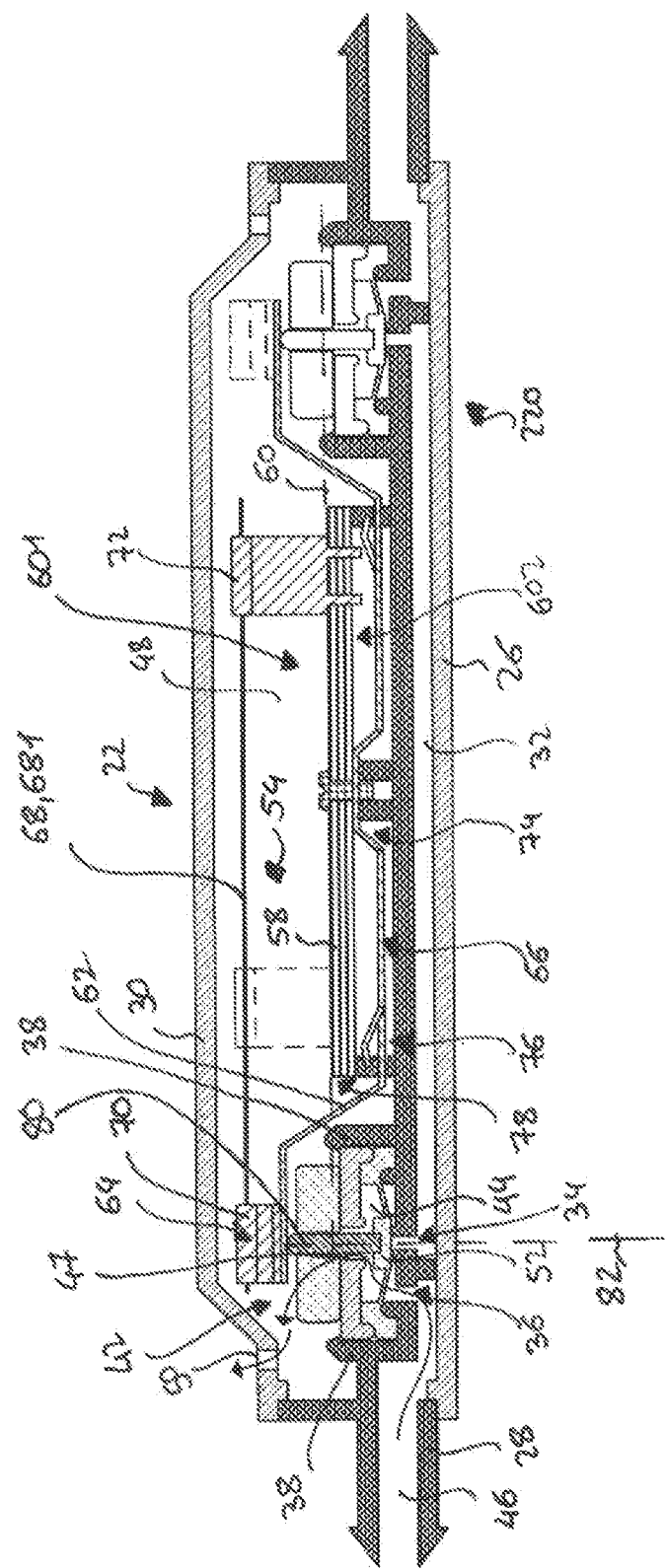
Figure 4:
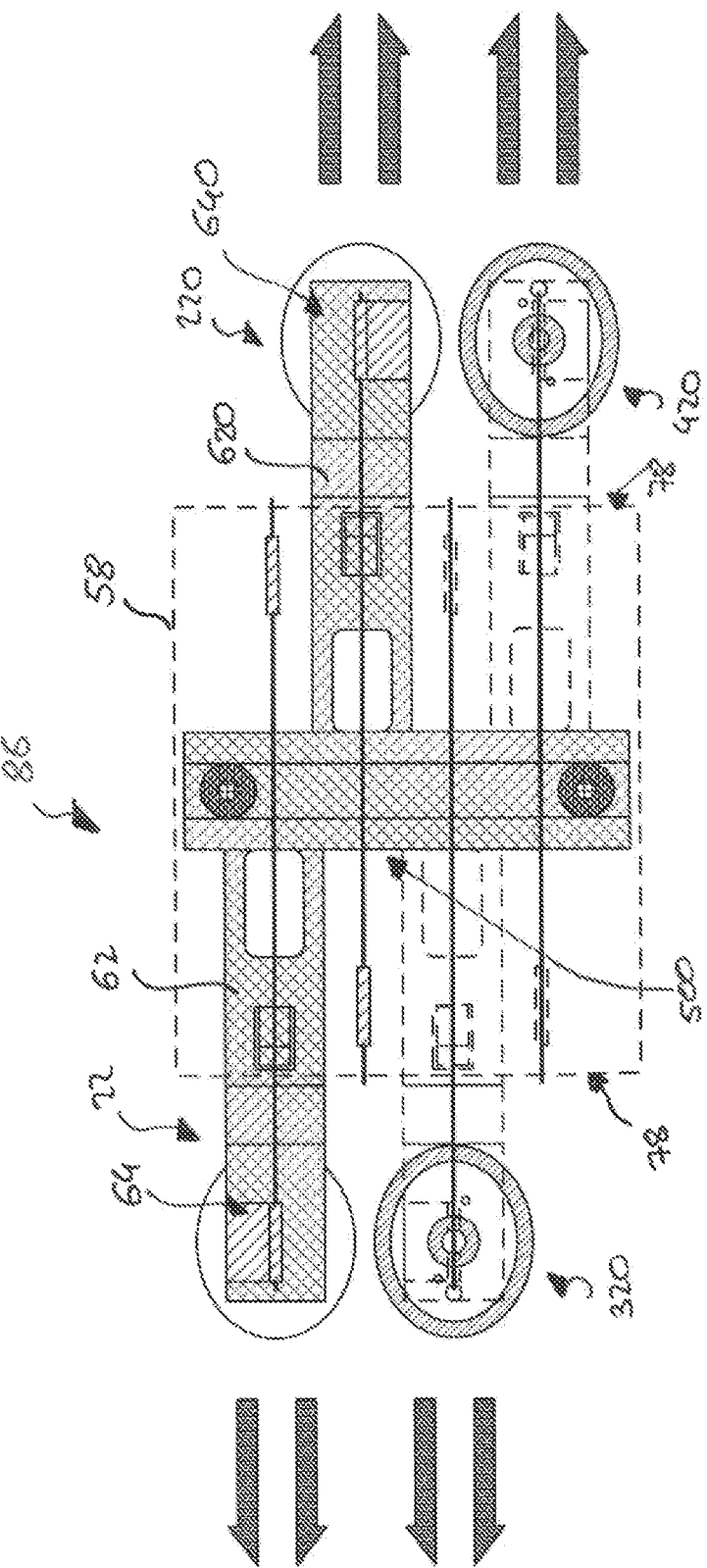

Further features and objects of the present invention will become apparent to a person skilled in the art by practicing the present teaching and taking into consideration the accompanying drawings. In the figures:

FIG. 1 shows a schematic view of an embodiment of an adjusting device according to the invention with a valve according to the invention which has an actuator unit according to the invention, wherein the actuator unit is shown in a first switching state, FIG. 2 shows a schematic view of the actuator unit from FIG. 1, wherein the actuator unit is shown in a second switching state, FIG. 3 shows a schematic detail view of a further embodiment of the actuator unit according to the invention, and FIG. 4 shows a schematic plan view of an embodiment of a valve assembly according to the invention.

Elements of identical design or function are provided with the same reference designations across all figures.

Reference is made firstly to FIG. 1, which shows a schematic view of an adjusting device 10 according to the invention for adjusting a contour 12 of a seat contact face 14 of a vehicle seat 16. Here, the vehicle seat 16 has a first fluid chamber or a first fluid bladder 18 and a second fluid chamber or a second fluid bladder 20, which, by filling and/or emptying, serve for the adjustment of the contour 12 of the seat contact face 14 of the vehicle seat 16. The adjusting device 10 furthermore has a valve 22 which is fluidically connected to the fluid bladders 18, 20 and to a fluid source 24.

The valve 22 has a base element 26, an intermediate element 28 connected to the base element 26 via webs, and a cover element 30 connected to the intermediate element 28. A first chamber 32, which is fluidically connected to the fluid source 24, is situated between the base element 26 and a central section of the intermediate element 28. The first chamber 32 is pressurized with the pressure medium, for example compressed air, provided by the fluid source 24.

The intermediate element 28 is designed such that a first fluid passage 34, which is fluidically connected to the first chamber 32, and a second fluid passage 36, which is fluidically connected to the first fluid passage 34, are created. The intermediate element 28 furthermore has webs 38 which extend to the cover element 30 and which delimit an upwardly open region 40. The region 40 is covered from above by a shut-off element 42 such that the shut-off element 42, the webs 38 and the intermediate element 28 form a second fluid chamber 44, which is fluidically connected to the first chamber 32 via the first fluid passage 34 and is fluidically connected to a third fluid chamber 46 via the second fluid passage 36. The third fluid chamber 46 forms a fluid connection which is fluidically connected to the first fluid bladder 18.

The shut-off element 42 furthermore has a third fluid passage 47, which fluidically connects a fourth fluid chamber 48, which is situated between the intermediate element 28 and the cover element 30, to the second fluid chamber 44.

The cover element 30 furthermore has an opening 50 which fluidically connects the fourth fluid chamber 48 to the surroundings of the valve 22.

The shut-off element 42 has a sealing element 52, for example in the form of a diaphragm element, which is movable between a first position and a second position. In a first position, the sealing element 52 closes the third fluid passage 47 and opens the first fluid passage 34, whereby pressure medium can flow from the fluid source 24 via the first fluid passage 34 and the second fluid passage 36 into the first fluid bladder 18 for the purposes of filling the fluid bladder 18, as indicated by the arrow in FIG. 1. In a second position, the sealing element 52 closes the first fluid passage 34 and opens the third fluid passage 47, as will be described in more detail in conjunction with FIG. 2.

Since the sealing element 52 closes the third fluid passage 47 in the first position, no pressure medium can flow into the fourth valve chamber 48, such that the fourth valve chamber 48 is not pressurized.

In order to move the sealing element 52 between the first and second positions, an actuator unit 54 is situated in the fourth valve chamber 48 of the valve 22. The actuator unit 54 has a circuit board 56 with a top side 58. The top side 58 extends in a circuit board plane, which is indicated by dashed lines with the reference designation 60.

The actuator unit 54 furthermore has an actuating element 62 which has an actuating section 64 and a bending section 66 connected to the actuating section 64. The bending section 66 makes it possible for the actuating section 64 to be movable by means of bending in the bending section 66. For this purpose, the bending section 66 has a (virtual) center of rotation about which the actuating section 64 can rotate.

The actuator unit 54 furthermore has an actuator element 68, the first end 70 of which is mechanically (and optionally electrically) connected to the actuating section 64 of the actuating element 62 and the second end 72 of which is mechanically (and optionally electrically) connected to the circuit board 56.

In the specific example of FIG. 1, the actuator element 68 is designed in the form of a shape memory alloy element 681, in particular in the form of a shape memory alloy wire. The shape memory alloy element 681 can deform, in particular become shorter, when electrical power is applied thereto. In this specific example, the first end 70 of the shape memory alloy element 681 is mechanically and electrically connected to the actuating section 64 and the second end 72 of the shape memory alloy element 681 is mechanically and electrically connected to the circuit board 56.

Since the first end 70 of the shape memory alloy element 681 is mechanically and electrically connected to the actuating section 64, the actuating section 64 can move or rotate about the bending section 66, or about the virtual center of rotation thereof, when electrical power is applied to the shape memory alloy element 681, owing to the shortening of the shape memory alloy element 681. In the specific example of FIG. 1, the actuating section 64 rotates clockwise about the virtual center of rotation of the bending section 66 when, for example, electrical power is applied to the shape memory alloy element 681.

The use of a shape memory alloy element 681 as an actuator element 68 is merely an example. It is self-evidently conceivable that actuator elements of variable length other than the described shape memory alloy element 681 may be used for moving the actuating section. For example, the actuator element 68 could also be designed as a hot wire or as an electroactive polymer.

When the actuator element 68 is actuated, or when electrical power is applied to the shape memory alloy element 681, the actuating element lifts off from the sealing element 52 such that the sealing element 52 (for example owing to its inherent prestress) can open up the first fluid passage 34, and pressure medium can flow from the fluid source 24 into the first fluid bladder 18 for the purposes of filling the fluid bladder 18.

The particular design embodiment of the actuator unit 54 now consists in that the actuating element 62 is arranged partially below and partially above the circuit board 56. More specifically, the actuating section 64 and the bending section 66 are arranged on two opposite sides with respect to the circuit board plane 60. As can be seen in the specific example of FIG. 1, it is for example the case that the actuating section 64 is arranged above the circuit board 56 or on a first side 601 with respect to the circuit board plane 60, and the bending section 66, which has the virtual center of rotation, is arranged below the circuit board 56 or on a second side 602, situated opposite to the first side 601, with respect to the circuit board plane 60.

By virtue of the fact that the actuating section 64 and the bending section 66 are arranged on opposite sides 601, 602 with respect to the circuit board plane 60, a relatively large lever H can be realized for a given structural height of the actuator unit 54. As a result, in the case of a specified actuator force exerted on the actuating section 64 by the actuator element 68 or the shape memory alloy element 681, a relatively high actuating force can be exerted on the sealing element 52 by the actuating section 64. The actuator unit 54 can thus, whilst having a relatively small structural height, provide a relatively high actuating force, for example for moving the sealing element 52. Likewise, a large lever H also makes it possible to realize the required stroke at the actuating section 64 or at the plunger element 80 with as small as possible an angle of rotation of the actuating element 62. A small angle of rotation prevents damage to the actuator element 68 at both ends 70 and 72 as a result of excessive bending movement at the connection points to the actuating element 62 and to the circuit board 56.

The actuator element 68 or the shape memory alloy element 681 is in this case situated exclusively on the first side with respect to the circuit board plane 60. In other words, the actuator element 68 is situated exclusively on that side on which the actuating section 64 is also situated. In this way, a force flow which is as linear as possible, and which is furthermore substantially perpendicular to the movement direction of the actuating section 64, is exerted on the actuating section 64 by the actuator element 68.

As can also be seen in FIG. 1, the actuating element 62 furthermore has a circuit board fastening section 74, which is electrically and mechanically connected to the circuit board 56. The circuit board fastening section 74 is in this case situated on the same side as the bending section 66. This has the advantage that, during the assembly of the actuator unit 54 or during the assembly of the valve 22, the actuating element 62 can first be installed, and the circuit board 56 is subsequently installed on the actuating element 62.

The actuating element 62 furthermore has an end position contacting section 76 which indicates an end position of the actuating section 64. As shown by way of example in FIG. 1, the end position contacting section 76 makes contact with the circuit board 56 in the end position of the actuating section 64. As soon as the end position contacting section 76 makes contact with the circuit board 56, an actuation of the actuator element 68 or a supply of electrical power to the shape memory alloy element 681 is interrupted. In this way, in particular if a shape memory alloy element 681 is used as the actuator element 68, the shape memory alloy element 681 is prevented from being excessively heated and, under certain circumstances, damaged. As can be seen in FIG. 1, the end position contacting section 76 is likewise situated below the circuit board or on the same side as the bending section 66. This in turn has assembly advantages, since during assembly first the actuating element 62 and then the circuit board 56 can each be installed on the intermediate element 28 by way of a simple rectilinear joining movement.

As can also be seen in FIG. 1, the actuating section 64 projects beyond a lateral edge of the circuit board 56. The lateral edge of the circuit board 56 is illustrated in FIG. 1 with the reference designation 78 and marks that edge of the circuit board 56 which marks the end of the circuit board 56 in the extent direction of the circuit board plane 60. Since the actuating section 64 projects beyond the lateral edge 78 of the circuit board 56, the actuating section 64 and the circuit board 56 are arranged adjacent to one another (in the longitudinal extent direction of the circuit board plane 60). On the one hand, this has the advantage that the actuator unit 54 has an even more compact design. On the other hand, installation space and material for the circuit board 56 can be saved in this way. In an embodiment of the actuator unit 54 according to the invention which is not shown in FIG. 1, the circuit board 56 may for example also have a cutout in the region of the actuating section 54.

As already mentioned, the sealing element 52 can be actuated by means of the actuating section 64, such that selectively either the first fluid passage 34 or the third fluid passage 47 is open or closed. In order now to be able to actuate the sealing element 52 by means of the actuating section 64, the actuator unit 54 has a plunger element 80 that is couplable to the actuating section 64. The plunger element may be couplable, for example in the form of a floating bearing, to the sealing element 52 at one side and to the actuating section 64 at the other side. The plunger element 80 produces a mechanical connection between the actuating element 64 and the sealing element 52. Here, the plunger element 80 extends in a longitudinal extent direction 82 that runs substantially perpendicular to the circuit board plane 60. In other words, the longitudinal extent direction 82 extends through the circuit board plane 60 or intersects the circuit board plane 60, in particular perpendicularly. This achieves a substantially 90° diversion between the substantially horizontally acting actuator force, which is exerted by the actuator element 68 or the shape memory alloy element 681, and the substantially vertically acting actuating force, which acts on the sealing element 52 through the plunger element 80. The 90° diversion has the advantage that a relatively high actuating force can be exerted on the sealing element 52 despite the relatively small structural height.

It is self-evidently also possible for the sealing element 52 to be integrated into the plunger element 80, such that the plunger element 80 is designed to bear sealingly against a valve seat of the first fluid passage 34.

As can also be seen in FIG. 1, the adjusting device 10 has a further valve 220, which is structurally identical to the valve 22 already mentioned. In the specific example of FIG. 1, the valve 220 is used to fill or empty the second fluid bladder 20.

It is self-evidently also possible for the valve 220 and also the valve 22 to be used for purposes other than the filling or emptying of the fluid bladders 18, 20. For example, the valves 22 and 220 may be connected pneumatically in series with a modified intermediate element 28 by virtue of the first fluid passage 340 of the valve 220 being connected to the pressure supply (fluid source 24), the first fluid passage 34 of the valve 22 being connected to the third fluid chamber 46, and the two second fluid passages 36 and 360 being connected to one another. In this way, a 3/3 valve is created from the two valves 22 and 220.

Reference is now made to FIG. 2, which shows again the valve 22 from FIG. 1. By contrast to FIG. 1, however, the actuator unit 54 is shown in FIG. 2 in a second switching state. In this second switching state, the sealing element 52 seals the first fluid passage 34 and the sealing element 52 opens up the third fluid passage 47. In the second switching position of the actuator unit 54, a pressure medium situated in the fluid bladder 18 can consequently flow via the third fluid chamber 46, the second fluid passage 36 and the third fluid passage 47 from the fluid bladder 18 into the fourth valve chamber 48 and from there via the opening 50 to the surroundings of the valve 22. In other words, in the second position of the actuator unit 54, the bladder 18 can be emptied, which is indicated schematically by the flow arrows.

Since, in the second position of the actuator unit 54, the first fluid passage 34 is closed by means of the sealing element 52, no pressure medium flows into the fourth fluid chamber 48 in the second switching state of the actuator unit 54 either. The actuator unit 54 is not acted upon with pressure medium, as is also the case in the second switching state. Since the actuator unit 54 is not acted upon with pressure medium either in the first switching state or in the second switching state, it is not necessary to provide an air-tight leadthrough of electrical lines or conductor tracks. This has considerable advantages in terms of the structural design and production of the valve 22.

As is also shown in FIG. 2, the bending section 66 is formed such that the actuating section 64 is preloaded in the direction of the second switching state of the actuator unit 54. As a result, the actuating section 64 can move the plunger element 80 in the direction of the first fluid passage 34, whereby the sealing element 52 closes the first fluid passage 34 and opens the third fluid passage 47.

The third fluid passage 47 can generally also be regarded as a valve opening of the valve 22, wherein the valve opening divides a valve chamber formed by the intermediate element 28 and the cover element 30 into a first region (fourth fluid chamber 48) and a second region (second fluid chamber 44). In this general formulation, the bending section 66 is thus formed such that the actuating section 64 is preloaded by the bending section 66 in a first position for opening the valve opening 47.

In order to now switch the actuator unit 54 from the first switching state (see FIG. 1) into the second switching state (see FIG. 2), it is merely necessary for an actuation of the actuator element 68 or a supply of electrical power to the shape memory alloy element 681 to be interrupted. This interruption reverses the previously caused shortening of the shape memory alloy element 681, such that the shape memory alloy element 681 resumes its original shape. The preloaded actuating section 64 can now, in the absence of actuation by the shape memory alloy element 681, move in the direction of the plunger element 80, which in turn moves the sealing element 52 toward the first fluid passage 34, whereby the first fluid passage 34 is closed and the third fluid passage 47 is opened. If another actuator element 68 is used instead of the shape memory alloy element 681, the movement of the plunger element 80 occurs accordingly (owing to the preload of the actuating section 64).

Reference is now made to FIG. 3, which shows a schematic detail view of a further embodiment of the actuator unit 54 from FIGS. 1 and 2. In the embodiment according to FIG. 3, the actuating section 64 has a flow guide section 84. The flow guide section 84 has the task, in the second position of the actuator unit 54, that is to say in the position of the actuator unit 54 in which the fluid bladder 18 is being emptied, of conducting a flow flowing out of the third fluid passage 47 away from the actuator element 68 or from the shape memory alloy element 681. This is indicated schematically by flow arrows. The flow guide section 84 may for example be a flow edge in the form of a beveled side edge of the actuating section 64. The advantage of the flow guide section 84 is that, in particular if the shape memory alloy element 681 is used as actuator element 68, the flow flowing out of the third fluid passage 47 does not cause any undesired cooling in the shape memory alloy element 681. In other embodiments of the actuator unit 54 that are not shown, it is self-evidently possible for the flow guiding section 84 to have other expedient design embodiments that conduct a flow, which under certain circumstances flows out of the third fluid passage 47, away from the actuator element 68.

Reference is finally made to FIG. 4, which shows a schematic plan view of a valve assembly 86 for the adjusting device 10.

The valve assembly 86 is composed of multiple valves, each of which opens and closes a corresponding valve opening. In the specific example of FIG. 4, the valve assembly 86 has a first valve 22, a second valve 220, a third valve 320 and a fourth valve 420, all of which are structurally identical. The valve assembly 86 is distinguished by the fact that the actuating element 62 of the valve 22 and a corresponding actuating element 620 of the valve 220 are formed in one piece in the form of a one-piece actuating element assembly 500. As a result, the respective actuating elements of the respective valves 22, 220, 320, 420 can be produced in a common processing step, whereby time and costs can be saved. In particular, it is thereby also possible for valve assemblies with different numbers of valves to be produced inexpensively and efficiently.

As can also be seen in FIG. 1, the respective actuating sections 64, 640 project beyond the lateral edge 78 of the circuit board 58. This once again illustrates the compact and material-saving design embodiment of the valve assembly 86.

Although the actuator unit 54 and the valves 22, 220, 320, 420 have been described in conjunction with FIGS. 1 to 4 in the context of the filling and emptying of fluid bladders 18, 20, it is also conceivable for the actuator unit 54 according to the invention and the valves 22, 220, 320, 420 according to the invention (and also the valve assembly 86) to be able to be used for other purposes, such as the above-described interconnection of in each case two valves to form a 3/3 valve.

The invention claimed is:

1. An actuator unit for at least one of opening and closing a valve opening of a valve for a pneumatic adjusting device of a vehicle seat, comprising:
   a circuit board, which has a top side which extends in a circuit board plane,
   an actuating element, which has an actuating section for at least one of opening and closing the valve opening and a bending section connected to the actuating section, and
   an actuator element, which has a first end which is mechanically connected to the actuating section and a second end which is mechanically connected to the circuit board, wherein the actuator element is configured to, when actuated, bend the bending section such that the actuating section is moved between a first position for opening the valve opening and a second position for closing the valve opening,
   wherein the actuating section is arranged on a first side with respect to the circuit board plane and the bending section is arranged on a second side, situated opposite the first side, with respect to the circuit board plane, and
   wherein the actuating section has a flow guide section which guides a flow flowing out of the valve opening away from the actuator element.

2. The actuator unit as claimed in claim 1, wherein the actuator element is a shape memory alloy element that is deformable by application of electrical power to the shape memory alloy element, and wherein the first end of the shape memory alloy element is electrically and mechanically connected to the actuating section and the second end of the shape memory alloy element is electrically and mechanically connected to the circuit board.

3. The actuator unit as claimed in claim 1, wherein the actuator element is arranged exclusively on the first side with respect to the circuit board plane.

4. The actuator unit as claimed in claim 1, wherein the actuating element further comprises a circuit board fastening section that is arranged on the second side with respect to the circuit board plane.

5. The actuator unit as claimed in claim 1, wherein the actuating element has an end position contacting section which, upon making contact with the circuit board, indicates an end position of the actuating section, wherein the end position contacting section is arranged on the second side with respect to the circuit board plane.

6. The actuator unit as claimed in claim 1, wherein the bending section is configured to, in an absence of actuation by the actuator element, preload the actuating section in the first position for opening the valve opening or in the second position for closing the valve opening.

7. The actuator unit as claimed in claim 1, further comprising:
  a plunger element which is designed to bear sealingly against a valve seat of the valve opening, wherein the plunger element is mechanically couplable to the actuating section and is arranged such that a longitudinal extent direction of the plunger element extends through the circuit board plane.

8. The actuator unit as claimed in claim 7, wherein the longitudinal extent direction extends substantially perpendicular to the circuit board plane.

9. The actuator unit as claimed in claim 1, wherein at least one of
  the actuating section projects beyond a lateral edge of the circuit board and
  the circuit board has a cutout in a region of the actuating section.

10. A valve for a pneumatic adjusting device of a vehicle seat, comprising:
  a valve housing which defines a valve chamber with a valve opening, and
  an actuator unit as claimed in claim 1 for at least one of opening and closing the valve opening.

11. The valve as claimed in claim 10, wherein the valve opening divides the valve chamber into a first region, which is fluidically connected to surroundings of the valve, and a second region, which is fluidically connected to a fluid source of the valve, and wherein the actuator unit is arranged in the first region.

12. A valve assembly for a pneumatic adjusting device of a vehicle seat, comprising:
  a first and a second valve as claimed in claim 10,
  wherein the actuating element of the first valve and the actuating element of the second valve are formed in one piece in form of a one-piece actuating element assembly.

13. An adjusting device for adjusting a contour of a seat contact face of a vehicle seat, having:
  a fluid bladder for adjusting the contour of the seat contact face, and
  a valve as claimed in claim 10, wherein the valve opening of the valve is fluidically connected to the fluid bladder.

14. A valve assembly for a pneumatic adjusting device of a vehicle seat, comprising:
  a first and a second valve as claimed in claim 10,
  wherein the valve opening of the first valve divides the valve chamber into a first region, which is fluidically connected to surroundings of the valve, and a second region, which is fluidically connected to a fluid source of the valve,
  wherein the actuator unit of the first valve is arranged in the first region, and
  wherein the actuating element of the first valve and the actuating element of the second valve are formed in one piece in form of a one-piece actuating element assembly.

15. A valve assembly for a pneumatic adjusting device of a vehicle seat, comprising:
  a first and a second valve as claimed in claim 11,
  wherein the actuating element of the first valve and the actuating element of the second valve are formed in one piece in form of a one-piece actuating element assembly.

16. An adjusting device for adjusting a contour of a seat contact face of a vehicle seat, having:
  a fluid bladder for adjusting the contour of the seat contact face, and
  a valve as claimed in claim 11, wherein the valve opening of the valve is fluidically connected to the fluid bladder.

* * * * *